D. M. COOPER.
STOP MECHANISM.
APPLICATION FILED NOV. 27, 1908.
1,011,162.
Patented Dec. 12, 1911.
2 SHEETS—SHEET 2.
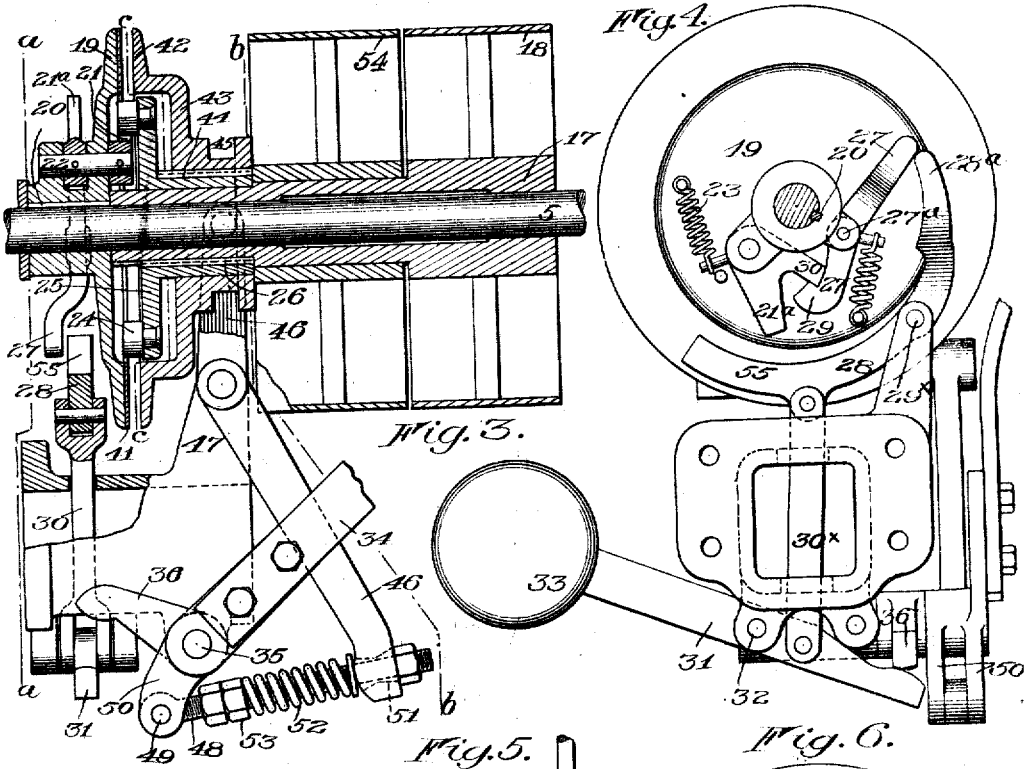

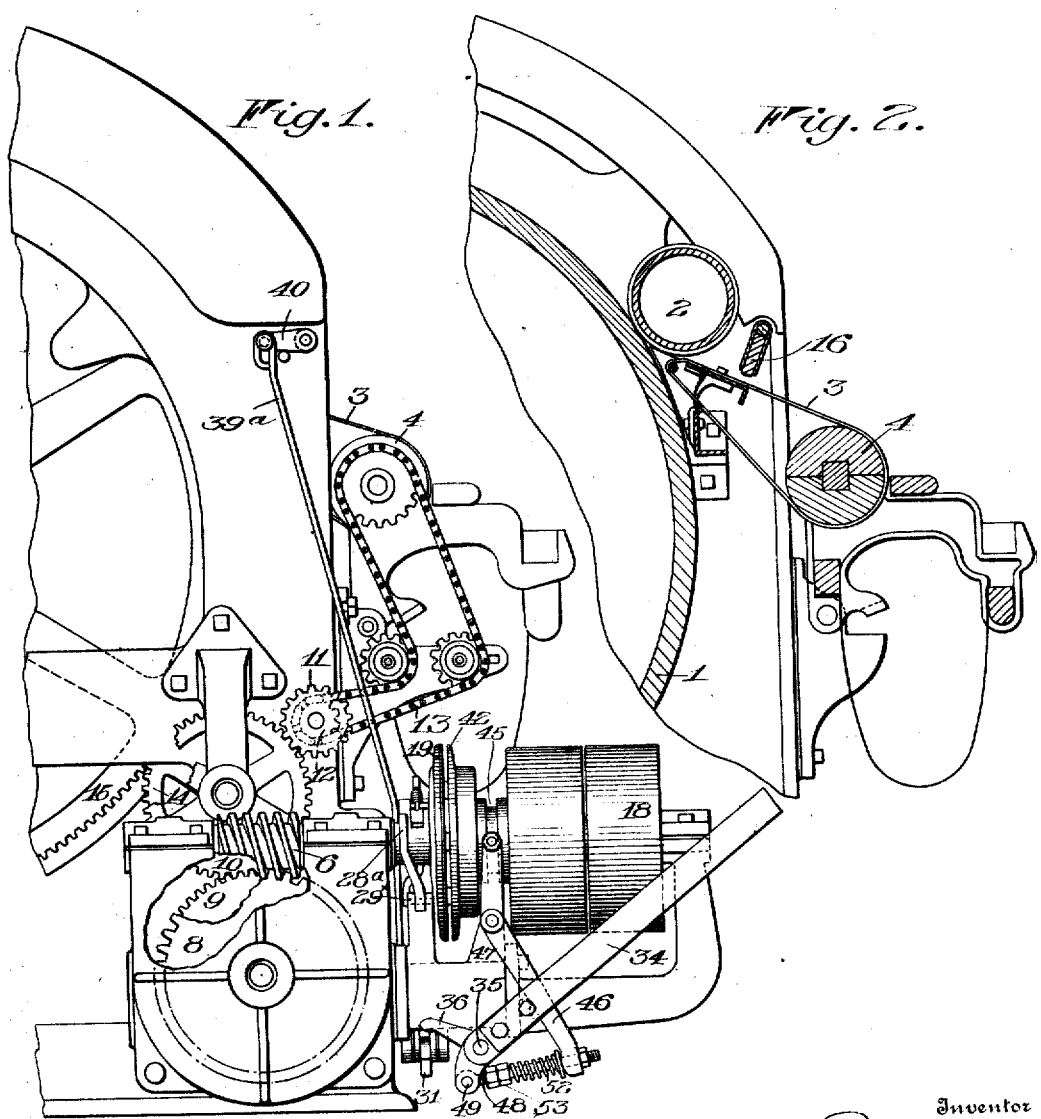

UNITED STATES PATENT OFFICE.

DANIEL M. COOPER, OF ROCHESTER, NEW YORK, ASSIGNOR, BY MESNE ASSIGNMENTS, TO AMERICAN LAUNDRY MACHINERY COMPANY, OF CINCINNATI, OHIO, A CORPORATION OF OHIO.

STOP MECHANISM.

1,011,162.  Specification of Letters Patent.  Patented Dec. 12, 1911.

Application filed November 27, 1908. Serial No. 464,616.

*To all whom it may concern:*

Be it known that I, DANIEL M. COOPER, of Rochester, in the county of Monroe and State of New York, have invented certain new and useful Improvements in Stop Mechanisms; and I do hereby declare the following to be a full, clear, and exact description of the same, reference being had to the accompanying drawings, forming a part of this specification, and to the reference-numerals marked thereon.

The present invention relates to stop-mechanisms for machinery of all kinds and it has for an object to provide a construction which will be simple and effective in operation, inexpensive to manufacture and not liable to get out of order.

To these and other ends the invention consists in certain improvements and combinations of parts all as will be hereinafter more fully described, the novel features being pointed out in the claims at the end of the specification.

In the drawings: Figure 1 is a side view of a portion of a mangle for clothes or other wash goods to which my invention is shown applied; Fig. 2 is a detail vertical section of the mangle showing the feeding mechanism and the tripping device; Fig. 3 is a sectional view in the direction of the axis of the driving and the driven element; Fig. 4 is a section on line $a-a$ Fig. 3; Fig. 5 is a section on line $b-b$ same figure; and Fig. 6 is a section on line $c-c$ also on same figure.

The invention is herein shown as applied to a mangle of the type embodying a large drum 1 with which coöperates a number of small rolls 2 (one only being shown), the goods being carried to the intake by a feeding mechanism comprising a series of belts or aprons 3 driven from a roller 4. On the frame of the machine is journaled a shaft 5 which carries a worm 6 that meshes with a worm wheel 8 and on the shaft of the latter is a gear 9 which drives a gear 10 that meshes with a pinion 11 having a sprocket 12 on its shaft to drive a chain 13 connecting with roller 4 to drive the feeding mechanism. The drum is driven by a gear 14 on the shaft of gear 10, said gear 14 being meshed with a large gear 15 that turns with drum 1. In this instance the stop mechanism is controlled by a finger board 16 that extends transversely of the feeding aprons and acts as a tripping device as will be hereinafter pointed out. The stop mechanism comprises a driving and a driven element, the driving element being preferably in the form of a sleeve 17 which surrounds shaft 5 and carries a pulley 18, while the driven element preferably comprises a disk 19 keyed to the shaft 5 at 20.

Connection between the driven and the driving element is preferably effected by a mechanism which may comprise a device such as a pivoted pawl or dog 21 fixed on the pintle 22 which turns on the driven element and in this instance normally tending to move to establish connection, under the action of a helical spring 23 or other device, said spring being secured at one end to the disk 19 and having its other end connected to the dog 21 to swing the latter outwardly. This device 21 may coöperate with any one of a series of stops 24 projecting from one face of a disk 25 that is keyed at 26 to the driving element. To hold the dog from engagement with stops or abutments 24, there may be employed a latch 27 which is preferably pivoted between its ends at 27ª on the opposite side of the disk 19 of the driven element and has a laterally turned nose or shoulder 29 to coöperate with a nose or shoulder 30 projecting from pivot 22 of device 21. After the latch has released dog 21 said latch is held out of the path of the dog by the coöperation between shoulders 29 and 30, as shown in dotted lines in Figs. 5 and 6.

The latch 27 may be operated to release dog 21 by a tripping mechanism which comprises preferably a tripping lever 28 pivoted at 29ˣ to a fixed part of the machine and having a deflected end 28ª normally lying out of the path of the deflected end of latch 27. For this purpose it is connected on the other side of its pivot by a link 30ˣ with an arm of double armed lever 31 that is pivoted at 32 to a fixed part and is acted on by a weight 33 or other device in which power may be stored. In order to store power in the power device 33 and at the same time to control the device 21 to cause it to establish connection between the driving and the driven element, there is employed a means which may coöperate with that arm of the lever 31 opposite that which carries the weight. This means preferably comprises a manually operable lever 34 turning on a shaft 35 and having an arm 36 projecting therefrom and engaging lever 31.

After the lever 31 has been shifted to store power in weight 33, the lever is held in this position by a latch 37 preferably in the form of a bell crank and having a nose 38 which coöperates with a projection 39 on the weight. The latch 37 is tripped by a tripping device which may comprise a pull bar 39ª connected at one end to one arm of the latch and at its other end to an arm 40 on the shaft of the finger board 16 which is arranged above the feeding aprons so that when an operator moves her hands too near the intake machine, the belts 3 will be stopped as will be hereinafter pointed out.

It is not desirable that the connection between the driving and the driven member be established by the movable dog 21, while the driven member is stationary as either it or the parts with which it coöperates are liable to break. To overcome this difficulty there is provided means for effecting connection between the driving and the driven element prior to the engagement of the dog with its coöperating part. This means may comprise a friction face 41 on the disk 19 of the driven element and a friction face 42 on a disk 43 that is keyed at 44 to the driving element so as to turn therewith and is movable axially of the driving element by any suitable means. Preferably disk 43 has its hub formed with a surrounding groove 45 in which works the two ends of a forked lever 46 which is pivoted intermediately of its ends to a fixed part at 47, and has its other end connected to the mechanism that controls dog 21 and stores power in weight 33. The connection with said mechanism is such that the friction faces are thrown into engagement before the dog is released, and after the faces engage, the mechanism has a continued independent movement which releases the dog. This may be effected by providing a resilient or yielding connection between the lever 46 and the manually operable lever 34, said connection preferably comprising a screw rod 48 pivotally connected at 49 to two depending arms 50 on the hub of lever 34, and sliding in an opening 51 in the lever 46, a helical spring 52 surrounding the rod 48 and abutting at one end against adjustable stops 53 and at its other end against lever 46.

To start the machine, the lever 34 is shifted. This first causes lever 46 to throw disk 43 into engagement with disk 19 to give the driven element an initial motion. A further movement of the lever 34 compresses spring 52 and depresses lever 31. This stores power in weight 33 which is held suspended by latch 37, and also moves a trip lever 28 so that its end 28ª will engage an end of latch 27, thus releasing dog 21 to permit the latter to coöperate with one of the stops 24 and establishing driving connection between the driving and the driven element, the latch 27 being held out of the path of the dog by coöperation between shoulders 29 and 30. The machine having started will continue until the finger guard or board 16 is shifted by an operator or the usual belt is shifted from pulley 18 to loose pulley 54. When the latch 37 releases weight 33, a cam 55 or other device which may be carried by trip 28 is shifted into the path of an arm 21ª carried by dog 21 causing the latter to be engaged and held against movement by latch 27 and breaking connection between the driving and the driven element. It will be noted that the end 28ª of lever 28 operates in a plane transverse to the axis of the driven member different from the plane of operation of cam 55 so that the latch 27 will not be operated by the cam and the part 21ª will not be engaged by end 28ª.

A machine embodying this invention insures the operator against loss of life or limb. The stop mechanism works with little friction and is simple in operation, and the construction of its parts are such that it may be easily repaired with little expense.

I claim as my invention.

1. The combination with a driving and a driven element, of a device having a tendency to move to establish connection between them, a latch for holding it from establishing said connection, and a pivoted member having a portion on one side of the pivot to coöperate with the latch to operate it and a portion on the other side of the pivot to coöperate with the connecting device to move the latter away from connecting position.

2. The combination with a driving and a driven element, of a device having a tendency to move to establish connection between them, a latch holding it from establishing said connection, a pivoted member having a portion on one side of the pivot to coöperate with the latch to operate it and a portion on the opposite side of the pivot to coöperate with the connecting device to move the latter from connecting position, means connected to said movable member to hold it out of coöperative relation with the latch and in coöperative relation with the connecting device, and a latch for holding the last mentioned means against action.

3. The combination with a driving and a driven element, of a device for establishing connection between them, a spring for moving said device in one direction, a latch for holding the device against movement under the action of the spring, a pivoted member having a portion to coöperate with the latch and a portion to coöperate with the connecting device to move the latter against action of its spring, and means connected with said pivoted member tending to move it in one direction.

4. The combination with a driving and a driven element, of a device for establishing connection between them, a spring for moving said device in one direction, a latch for holding the device against movement under the action of the spring, a pivoted member having a portion to coöperate with the latch and a portion to coöperate with the connecting device to move the latter against action of its spring, a double armed lever, a weight carried on one side of its pivot, and a connection between the pivoted member and the double armed lever on the other side of the pivot of the latter.

5. The combination with a driving and a driven element, of a connecting device having a tendency to move to establish connection between them, a latch for holding the device against such action, a pivoted member having a portion to coöperate with the latch to operate it and a portion to coöperate with the connecting device to move the latter away from connecting position, a weighted lever connected to the pivoted member, a manually operable lever coöperating with the weighted lever to raise the weight, and a latch for holding the weighted lever in raised position.

6. The combination with a driving and a driven element, of a device having a tendency to move to establish connection between them, of a latch for holding the device so that it will not establish connection, a member pivoted between its ends and having a portion on one side of its pivot adapted to coöperate with the latch to release the connecting device and a portion on the other side of its pivot adapted to coöperate with the connecting device to break connection between the driving and the driven element, a double armed lever having connection with the pivoted member on one side of its pivot, a weight on the lever on the other side of its pivot, and a manually operable lever having an arm adapted to coöperate with the double armed lever to elevate the weight.

7. The combination with a driving and a driven element, of a pair of friction members rotating with said elements, one being movable into engagement with the other, of a dog having a normal tendency to establish connection between the elements, a latch holding the dog from connecting position, and mechanism for controlling the latch having connection with the movable friction member to move it into engagement with the other friction member prior to the engagement of the dog.

8. The combination with a driving and a driven element, of a device having a normal tendency to establish connection between them, a latch adapted to hold the device from connecting position, mechanism for controlling said latch, and a device resiliently connected to said mechanism to be operated by the latter to establish connection between the driving and the driven element prior to the establishment of connection by the first mentioned connecting device.

9. The combination with a driving member and a driven member, of a dog having a tendency normally to establish positive connection between them, friction elements rotating with said members, one of the elements being movable to establish connection with the other, and controlling means for the dog and friction elements including a resilient connection whereby the friction elements are engaged prior to the movement of the dog and are held yieldably in engagement while the dog is moving to establish positive connection.

10. The combination with a driving and a driven element, of a dog having a tendency to establish connection between them, a pair of friction members rotating with the driving and the driven element, one of said members being movable to engage the other, mechanism for controlling the dog embodying a manually operable lever, and connection between the lever and the movable friction member comprising a lever pivoted between its ends, having one end engaging the movable friction member, a pull bar loosely connecting both levers, and a helical spring surrounding the pull bar and abutting the latter and one of the levers.

11. The combination with a driving and a driven element, of a device having a tendency to move to establish connection between them, a latch for holding said device from establishing such connection, a movable member having a portion to coöperate with the latch to operate the latter and a portion to coöperate with the connecting device to move the latter away from connecting position, two relatively movable friction members, one connected to the driving and the other to the driven member, and an operating means resiliently connected to the movable friction member and also connected to the movable member first mentioned to operate the latch in order to release the connecting device.

12. The combination with a driving and a driven element, of a device having a tendency to move to establish connection between them, a latch for holding said device from establishing connection, a movable member having a portion to coöperate with the latch to operate the latter and a portion to coöperate with the connecting device to move the latter away from connecting position, a weighted lever connected to the said movable member, two relatively movable friction members, one connected to the driving and the other to the driven member, and an operating means comprising a manually operable lever having an arm coöperating with the weighted lever and also having a resilient connection with the movable friction member.

13. The combination with a driving and a driven element, of a connecting device having a tendency to move to establish connection between them, a latch for holding the device against such action, a pivoted member having a portion to coöperate with the latch to operate it and a portion to coöperate with the connecting device to move the latter away from connecting position, a weighted lever connected to the pivoted member, a manually operable lever coöperating with the weighted lever to raise the weight, a latch for holding the weighted lever in raised position, two relatively movable friction members, one connected to the driven and the other to the driving element, and a resilient connection between the movable friction member and the manually operable lever, whereby the driven element is caused to rotate prior to its positive connection with the driving element.

DANIEL M. COOPER.

Witnesses:
RUSSELL B. GRIFFITH,
HAROLD H. SIMMS.